(12) United States Patent
Takaishi et al.

(10) Patent No.: US 9,729,761 B2
(45) Date of Patent: Aug. 8, 2017

(54) COLOR MANAGEMENT SYSTEM, NON-TRANSITORY COMPUTER READABLE MEDIUM, AND COLOR MANAGEMENT METHOD FOR SUBSTITUTING A CORRECTION PROFILE OF A FIRST MEDIUM AS A CORRECTION PROFILE FOR A SECOND MEDIUM

(71) Applicant: FUJI XEROX CO., LTD., Tokyo (JP)

(72) Inventors: Shinya Takaishi, Kanagawa (JP);
Pauvi Sulistio, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/018,117

(22) Filed: Feb. 8, 2016

(65) Prior Publication Data
US 2017/0070647 A1 Mar. 9, 2017

(30) Foreign Application Priority Data

Sep. 8, 2015 (JP) .................................. 2015-176443

(51) Int. Cl.
*H04N 1/60* (2006.01)
*H04N 1/00* (2006.01)

(52) U.S. Cl.
CPC ......... *H04N 1/6041* (2013.01); *H04N 1/0009* (2013.01); *H04N 1/00023* (2013.01); *H04N 1/00037* (2013.01); *H04N 1/00058* (2013.01); *H04N 1/00087* (2013.01); *H04N 1/6075* (2013.01); *H04N 1/6094* (2013.01); *H04N 2201/0094* (2013.01)

(58) Field of Classification Search
None
See application file for complete search history.

(56) References Cited

U.S. PATENT DOCUMENTS

| 8,400,677 B2 | 3/2013 | Sakamoto et al. |
| 2004/0239935 A1* | 12/2004 | Kitazawa .................. G01J 3/46 356/406 |
| 2016/0044211 A1* | 2/2016 | Yamaguchi .......... H04N 1/6072 358/2.1 |

FOREIGN PATENT DOCUMENTS

| JP | 2011-9920 A | 1/2011 |
| JP | 2011-101255 A | 5/2011 |

* cited by examiner

*Primary Examiner* — Barbara Reinier
(74) *Attorney, Agent, or Firm* — Sughrue Mion, PLLC (57) ABSTRACT

A color management system includes a memory and a controller. The memory stores a correction profile for a first medium, the correction profile being provided for correcting a difference between multiple colorimeters. The controller uses, as an evaluation index and on a basis of a result of colorimetry performed on a second medium that is different from the first medium, at least one of a color difference, a hue difference, or a lightness difference between the first medium and the second medium and uses the correction profile for the first medium as a correction profile for the second medium in a case where the evaluation index is equal to or lower than a corresponding one of thresholds.

4 Claims, 7 Drawing Sheets

|  | COLORIMETER A | COLORIMETER B | COLORIMETER C |
|---|---|---|---|
| COLORIMETER A | — | (1)<br>A-to-B | (2)<br>A-to-C |
| COLORIMETER B | (3)<br>B-to-A | — | (4)<br>B-to-C |
| COLORIMETER C | (5)<br>C-to-A | (6)<br>C-to-B | — |

| | COLORIMETER A (M0) | | | COLORIMETER B (M2) | | | FIRST JUDGMENT | SECOND JUDGMENT | |
|---|---|---|---|---|---|---|---|---|---|
| | | | | | | | COLOR DIFFERENCE IN B | RELATIVE HUE DIFFERENCE | ABSOLUTE L* DIFFERENCE |
| J PAPER | 94.10 | −0.11 | −0.87 | 94.19 | −0.46 | 0.23 | 1.49 | 0.2 | 0.1 |
| X PAPER | 94.22 | 0.88 | 0.08 | 94.11 | 0.47 | 1.38 | | | |

| | COLORIMETER A | | COLORIMETER B | | FIRST JUDGMENT | SECOND JUDGMENT | |
|---|---|---|---|---|---|---|---|
| | | | | | COLOR DIFFERENCE IN B | RELATIVE HUE DIFFERENCE | ABSOLUTE L* DIFFERENCE |
| auro | 93.96 | 0.49 | −1.14 | 93.80 | −0.12 | 0.90 | | |
| OK | 93.46 | 0.15 | 0.21 | 93.52 | −0.49 | 2.50 | 1.67 | 0.2 | 0.6 |

FIG. 7

COLOR MANAGEMENT SYSTEM, NON-TRANSITORY COMPUTER READABLE MEDIUM, AND COLOR MANAGEMENT METHOD FOR SUBSTITUTING A CORRECTION PROFILE OF A FIRST MEDIUM AS A CORRECTION PROFILE FOR A SECOND MEDIUM

CROSS-REFERENCE TO RELATED APPLICATIONS

This application is based on and claims priority under 35 USC 119 from Japanese Patent Application No. 2015-176443 filed Sep. 8, 2015.

BACKGROUND (i) Technical Field

The present invention relates to a color management system, a non-transitory computer readable medium, and a color management method.

(ii) Related Art

Image forming apparatuses such as printers perform color conversion on input raster images in accordance with profile data. The profile data is generated in such a manner that a printer prints a chart pattern or color patches (hereinafter, simply referred to as "color patches") each of which serves as a color reference and colorimetry is performed on the printing result.

Meanwhile, when being performed using multiple colorimeters on color patches printed on a sheet of paper, the colorimetry produces different colorimetry results (inter-colorimeter color-differences) in some cases due to differences between the characteristics of the colorimeters (individual variations).

SUMMARY

According to an aspect of the invention, there is provided a color management system including a memory and a controller. The memory stores a correction profile for a first medium, the correction profile being provided for correcting a difference between multiple colorimeters. The controller uses, as an evaluation index and on a basis of a result of colorimetry performed on a second medium that is different from the first medium, at least one of a color difference, a hue difference, or a lightness difference between the first medium and the second medium and uses the correction profile for the first medium as a correction profile for the second medium in a case where the evaluation index is equal to or lower than a corresponding one of thresholds.

BRIEF DESCRIPTION OF THE DRAWINGS

An exemplary embodiment of the present invention will be described in detail based on the following figures, wherein.

DETAILED DESCRIPTION

Hereinafter, an exemplary embodiment of the invention will be described on the basis of the drawings.

Basic Principle

First, a basic principle in the exemplary embodiment will be described.

Correction profiles (or conversion profiles) for correcting differences between colorimeters (inter-colorimeter differences) are provided for media, respectively. If the media have identical or similar characteristics, correction profiles accordingly ought to be identical or similar. The correction profile for a specific medium may be used (substituted) for the correction profile for another medium. Whether the media have identical or similar characteristics may be judged from results of colorimetry performed to obtain paper white values of the media.

Colorimetry values of media include RGB values and Lab values. Either the RGB values or the Lab values or both may be used. In other words, whether the media have identical or similar characteristics may be judged by using:

(1) RGB values;
(2) Lab values; or
(3) RGB values and Lab values.

Further, (3) allows not only simultaneous use of the RGB values and the Lab values but also the use of the RGB values for a first judgment and the Lab values for a second judgment. In the exemplary embodiment, a case where one of the RGB values (specifically, B) is particularly used for the first judgment and where the Lab values are used for the second judgment is taken as an example, but the exemplary embodiment is not limited thereto.

In the case of using the RGB values, at least one of the RGB values of a specific medium (first medium) is compared with that of another medium (second medium). If a difference between the media, that is, a color difference is equal to or lower than a threshold, the media may be considered to have identical or similar characteristics.

In the case of using the Lab values, at least either an L value or one of a and b values of a specific medium (first medium) is compared with that of another medium (second medium). If a difference between the media, that is, a lightness difference in terms of the L value or a hue difference in terms of the a or b value is equal to or lower than a corresponding one of thresholds, the media may be considered to have identical or similar characteristics. In other words, a color difference between a specific medium (first medium) and another medium (second medium), that is, at least one of a hue difference and a lightness difference is used as an evaluation index. If the evaluation index is equal to or lower than the corresponding threshold, the media are considered to have identical or similar characteristics, and the correction profile for the specific medium (first medium) is substituted for that for the other medium (second medium). This eliminates labor taken to generate a new correction profile for the other medium.

In the exemplary embodiment described below, a case where a correction profile is substitutable if each of a color difference, a hue difference, and a lightness difference that are used as evaluation indexes is equal to or lower than a corresponding one of thresholds is taken as an example. However, the exemplary embodiment is not limited thereto. In other words, any one of:

(a) only a color difference;
(b) only a hue difference;
(c) only a lightness difference;
(d) a color difference and a hue difference;
(e) a color difference and a lightness difference; and
(f) a hue difference and a lightness difference may be used. These may be combined in accordance with the desired correction profile accuracy. The most accurate method involves using an algorithm in which a color difference, a hue difference, and lightness difference are used for judgment. Since a hue may be expressed using vectors in an ab coordinate system, the hue difference may be regarded as a vector difference when performing evaluation.

In the exemplary embodiment, an increase in the number of types of media already provided with correction profiles leads to a high probability of correction profile substitutability. Consider a case where a medium provided with a correction profile is Ji (i=1, 2, 3, . . . ) and another medium is X. In this case, evaluation is performed by using any one of the following as one or more evaluation indexes:

least one of a color difference, a hue difference, and a lightness difference for X and J1
at least one of a color difference, a hue difference, and a lightness difference for X and J2;
at least one of a color difference, a hue difference, and a lightness difference for X and J3; and . . . .

A profile for a medium Jk having an evaluation index that is equal to or lower than a corresponding one of thresholds and is the lowest of the indexes of the media is substituted for the correction profile for the medium X.

A system that remotely manage color reproduction will be described as an example of the exemplary embodiment.

Configuration

Figure 1:
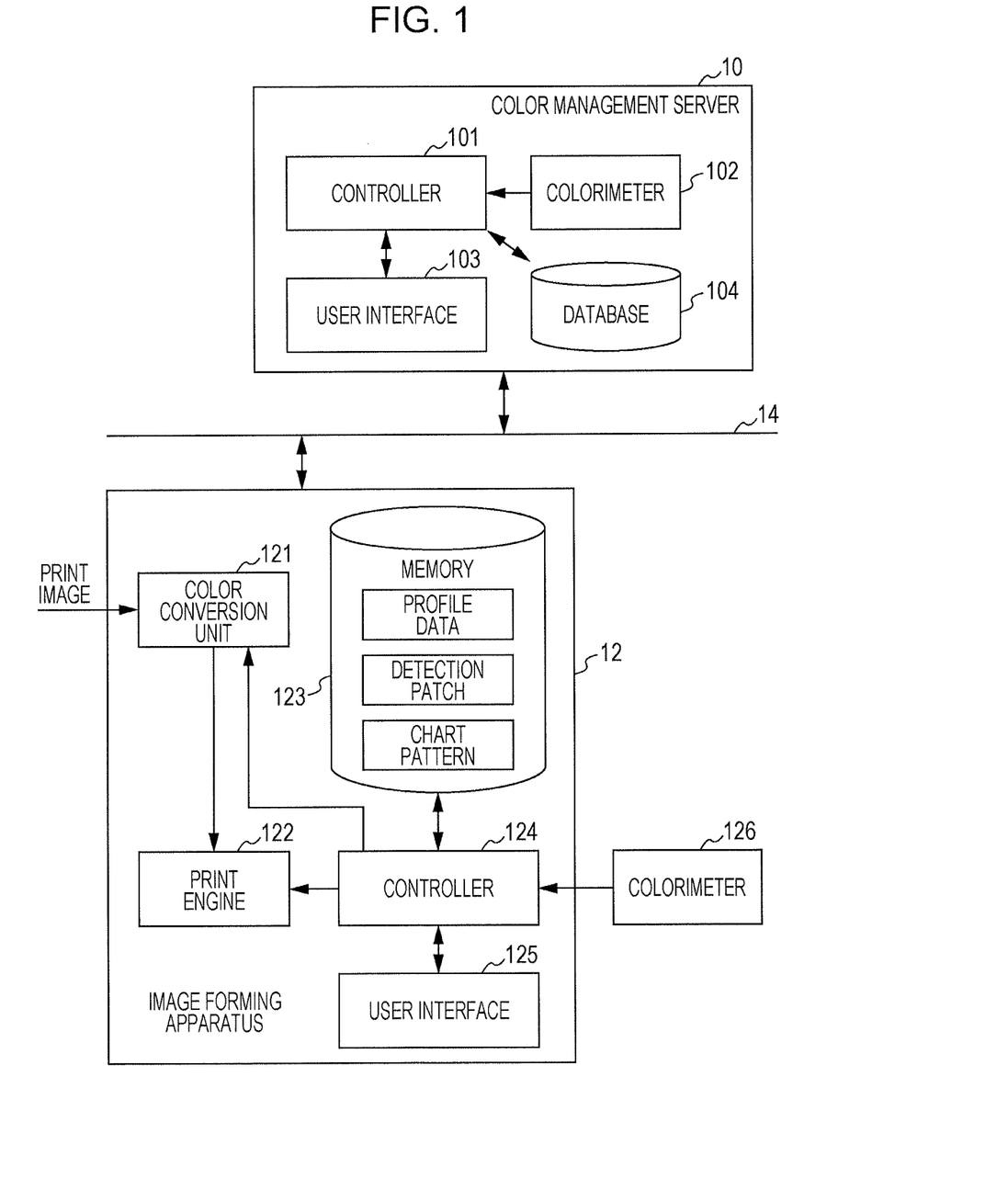
FIG. 1 is a system configuration diagram in the exemplary embodiment.

FIG. 1 is a system configuration diagram of a color management system in the exemplary embodiment. The color management system includes a color management server 10 and an image forming apparatus 12. The color management server 10 and the image forming apparatus 12 are connected to each other through a network 14.

The color management server 10 includes a controller 101, a colorimeter 102, a user interface 103, and a database 104. In addition to these components, the color management server 10 that is a server computer has a publicly known configuration, specifically, an input/output interface, and various types of memory (such as a program memory, a working memory, and an auxiliary memory), but these components are omitted herein. The database 104 is used to store correction profiles for each medium type. The colorimeter 102 performs measurement on color patches and supplies measurement results to the controller 101. The colorimeter 102 functions as a reference measurement device.

The image forming apparatus 12 is a printer, a multifunction printer, or a similar apparatus and includes a color conversion unit 121, a print engine 122, a memory 123, a controller 124, and a user interface 125. A colorimeter 126 may be included in the image forming apparatus 12 or may be provided separately.

The image forming apparatus 12 executes a process for printing and outputting input print image data. Examples of the print image data include bitmap image data and image data described in a page description language (PDL). In a case where the image forming apparatus 12 includes a scanner, data regarding an image read by the scanner may be used as print image data. The print image data is converted by an interpreter (not illustrated) or other image processers into a raster image processable by the print engine 122.

The color conversion unit 121 performs color conversion on the raster image in accordance with profile data. The profile data is data including information indicating a correspondence in lattice point color coordinates between an input color space and an output color space. The profile data may be, for example, an International Color Consortium (ICC) profile or a profile supporting a standard specified by the manufacturer of the image forming apparatus 12. The output color space is the color space of the print engine 122 and is typically represented by the combination of four colors of cyan (C), magenta (M), yellow (Y), and black (K). However, the colors are not limited to the four colors. The profile data is generated by the controller 124 and stored in the memory 123. For example, the profile data may be generated for each medium type and stored in the memory 123, and a user may select data suitable for used medium from multiple pieces of profile data and may then use the data. The color conversion unit 121 calculates, for each pixel of a raster image and on the basis of the profile data, color coordinates in the output color space by using the values of the pixel (color coordinates) as the values of the color coordinates in the input color space.

The print engine 122 prints an image output by the color conversion unit 121 as a result of the color conversion.

The controller 124 performs overall control of the image forming apparatus 12. For example, the controller 124 receives a printing instruction from a user through the user interface 125, controls the color conversion unit 121, the print engine 122, and other components, and performs printing of an image designated in the printing instruction. The controller 124 also executes a process for generating profile data. To generate the profile data, the print engine 122 prints a chart pattern serving as a color reference, the colorimeter 126 measures the result of printing, and the result is used for the profile data. The chart pattern is an image pattern in which, for example, color patches having different densities are arranged for each of the colors of CMYK. The data of the chart pattern is stored in the memory 123, and the controller 124 reads out the data and causes the print engine 122 to print an image.

The user interface 125 notifies the user of the state of the image forming apparatus 12 and receives designation input by the user. The user interface 125 may include a display device such as a liquid crystal touch panel and input buttons such as a keypad.

In such a system, the color reproduction characteristics of the print engine 122 of the image forming apparatus 12 are likely to change over time. To adapt to the change, the color management server 10 needs to manage the profile data. The colorimeter 102 of the color management server 10 and the colorimeter 126 of the image forming apparatus 12 use the same chart and desirably output the same measurement result. However, inter-colorimeter color-differences might be present as described above, and correction thereof is thus needed. Meanwhile, the correction profiles for correcting inter-colorimeter differences are provided for media, respectively. If the correction profiles are generated for all of the media and stored in the database, the generation leads to a huge number of man-hours.

In the exemplary embodiment, consider a case of generating a correction profile for correcting an inter-colorimeter difference between the colorimeter 102 of the color management server 10, that is a reference colorimeter, and the colorimeter 126 of the image forming apparatus 12, that is, a colorimeter whose values are to be corrected. If the database has one or more correction profiles that have been generated and registered for one or more specific media, respectively, the controller 101 of the color management server 10 judges whether a correction profile is to be generated for a new medium that is different from media in the database. If there is no need to generate a new correction profile, the corresponding existing correction profile is substituted for the new medium, and the man-hours for generation are thereby reduced.

For example, consider a case where the database has a correction profile for a specific medium that is J paper and where it is judged whether a correction profile needs to be generated for X paper different from J paper. If it is judged that a correction profile does not need to be generated, the correction profile for J paper is substituted for X paper. Whether a correction profile needs to be generated is judged in such a manner that colorimetry is performed on only paper white of J paper and X paper and that a color difference, a hue difference, and a lightness difference are thereby calculated and compared with the respective thresholds.

The controller 101 executes the process including:
performing colorimetry on X paper;
calculating a color difference, a hue difference, and a lightness difference each between the result of J paper colorimetry registered in the database 104 and the result of X paper colorimetry; and
comparing each of the color difference, the hue difference, and the lightness difference that are thus calculated with a corresponding one of thresholds and judging whether the correction profile is substitutable.

The controller 101 reads out processing programs stored in the program memory, executes the programs serially, and thereby executes the processes described above.

Figure 2:
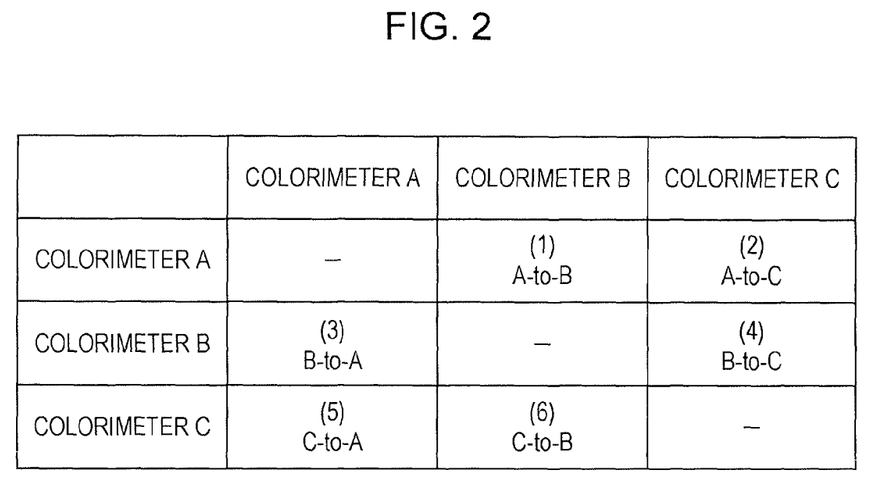
FIG. 2 is a table illustrating a correction profile generated for a medium.

FIG. 2 illustrates an example of a correction profile for correcting an inter-colorimeter difference for J paper. A colorimeter A, the colorimeter B, and a colorimeter C are used as colorimeters. With reference to FIG. 1, for example, the colorimeter A corresponds to the colorimeter 126, the colorimeter B corresponds to the colorimeter 102, and the colorimeter C corresponds to the colorimeter of another image forming apparatus.

As correction profiles for correcting three inter-colorimeter differences between the colorimeters A and B, between the colorimeters A and C, and between the colorimeters B and C, six profiles may exist as follows:
A-to-B (correction profile 1);
A-to-C (correction profile 2);
B-to-A (correction profile 3);
B-to-C (correction profile 4);
C-to-A (correction profile 5); and
C-to-B (correction profile 6).

For example, A-to-B indicates a correction profile for correcting the characteristic of the colorimeter A to the colorimeter B (a correction profile used for the colorimeter A when the colorimeter B serves as a reference colorimeter). The color management server 10 stores a table of such correction profiles for J paper in the database. The database stores not only the correction profiles but also colorimetry values that are pieces of data used when a correction profile is generated, that is, RGB values or Lab values obtained when colorimetry is performed on paper white of J paper by using the colorimeters.

A process in the exemplary embodiment will be described by taking as an example a case where the A-to-B correction profile is generated for X paper different from J paper.

Figure 3:
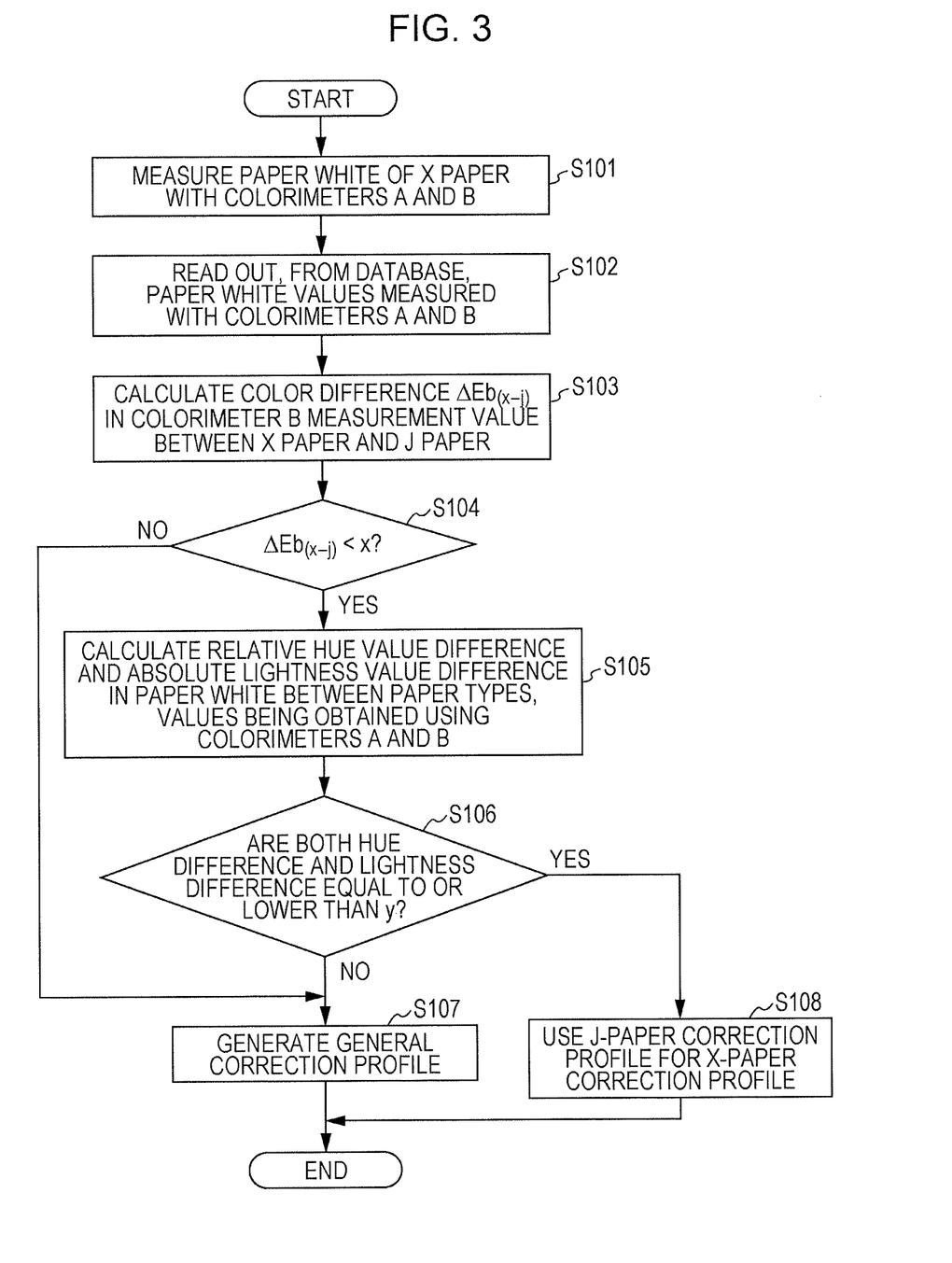
FIG. 3 is a flowchart of the exemplary embodiment.

FIG. 3 is a flowchart of the process in the exemplary embodiment.

First, colorimetry is performed on paper white of X paper by using the colorimeter A and the colorimeter B (S101).

The controller 101 reads out paper white values of J paper respectively measured using the colorimeter A and the colorimeter B, the paper white values being registered in the database (S102).

The controller 101 calculates a color difference $\Delta Eb_{(x-j)}$ between J paper and X paper, on the basis of the value of X paper measured using, for example, the colorimeter B and the value of J paper measured using, for example, the colorimeter B and read out from the database (S103).

The controller 101 compares the calculated color difference $\Delta Eb_{(x-j)}$ with a threshold x (S104). The process of comparing the color difference in paper white between X paper and J paper with the threshold is referred to as a first judgment process. If it is judged that the color difference $\Delta Eb_{(x-j)}$ is equal to or higher than the threshold x, it is judged that the correction profile for J paper is not substitutable, and a correction profile is generated for X paper (S107).

If it is judged that the color difference $\Delta Eb_{(x-j)}$ is lower than the threshold x, the controller 101 calculates a relative hue value difference and an absolute lightness value difference each between X paper and J paper, the values being obtained using the colorimeter A and the colorimeter B (S105). The controller 101 compares the relative hue value difference and the absolute lightness value difference with a threshold (S106). If any one of the relative hue value difference and the absolute lightness value difference exceeds the threshold, it is judged that the correction profile for J paper is not substitutable, and a new correction profile is generated for X paper (S107). If both of the relative hue value difference and the absolute lightness value difference are equal to or lower than the threshold, the correction profile for J paper, that is, the correction profile 1 described above is substituted for the correction profile for X paper (S108). In this case, a new correction profile does not need to be generated.

Hereinafter, the process in the exemplary embodiment will be specifically described.

Figure 4:
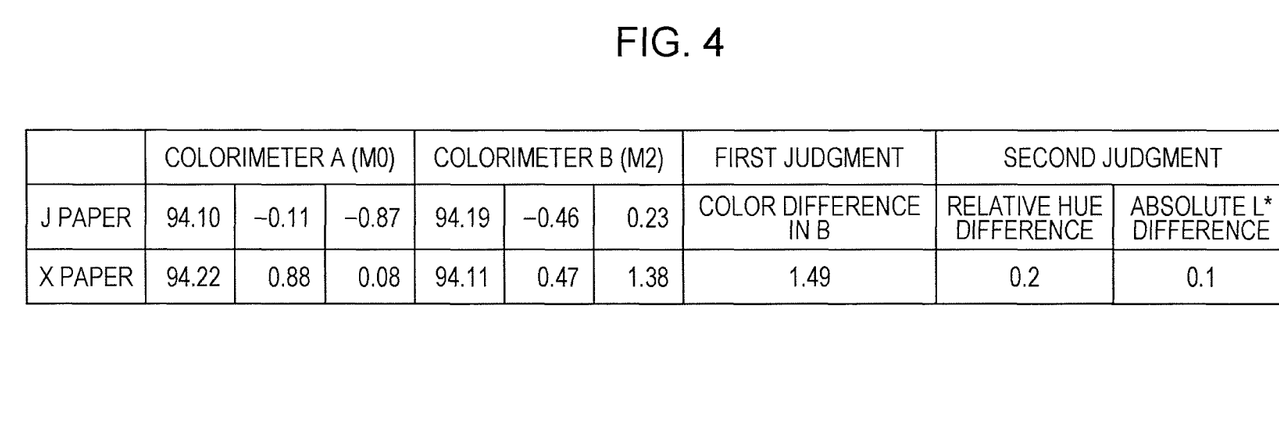
FIG. 4 is a table illustrating examples of a color difference and a relative hue value difference in a case where a correction profile is substitutable.

FIG. 4 illustrates results of colorimetry performed on J paper and X paper in a case where M0 and M2 are used for the colorimeter A and the colorimeter B, respectively. Note that M0 and M2 denote colorimetry modes specified in International Organization for Standardization (ISO) standards as follows:

M0 is an illumination condition for International Commission on Illumination (CIE) Illuminant A and is an illumination condition for incandescent lamps having spectral distribution close to that of a color temperature of 2856 K±100 K. M0 is typically used in a case where paper or a color material does not emit fluorescence.

M2 is an illumination condition for UV blocking (a case where a UV-blocking filter is attached) and is used in a case where paper emits fluorescence and where preventing the influence of UV on data is desired.

In addition to these modes, M1 and M3 are specified as the colorimetry modes and may also be used.

M1 is an illumination condition that matches CIE illuminant D50. Part 1 of the condition is used in a case where paper, a color material, or both emit fluorescence. Part 2 is used in a case where paper emits fluorescence and where a color material does not emit fluorescence.

M3 is an illumination condition for a polarizing filter and is used in a case where a polarizing filter is used to minimize surface reflection. The colorimetry performed on J paper results in:

L=94.10, a=−0.11, and b=−0.87 when the colorimeter A is used; and

L=94.19, a=−0.46, and b=0.23 when the colorimeter B is used.

The colorimetry performed on X paper results in: L=94.22, a=0.88, and b=0.08 when the colorimeter A is used; and L=94.11, a=0.47, and b=1.38 when the colorimeter B is used.

In the first judgment process in this case, the color difference between X paper and J paper is compared with a threshold. For example, the color difference in the B value is calculated as 1.49.

In the second judgment process, a relative hue value difference and an absolute lightness value difference between X paper and J paper are compared with a threshold. The relative hue value difference and the absolute lightness value difference are calculated as 0.2 and 0.1, respectively.

In a case where the thresholds in the first and second judgment processes are, for example, 1.5 and 0.3, respectively, each value in the first judgment process and the second judgment process is lower than the corresponding threshold. Accordingly, in the flowchart of the process in FIG. 3, the judgements in steps S104 and S106 are YES and YES, respectively, and the correction profile for J paper is thus substitutable.

Figure 5:
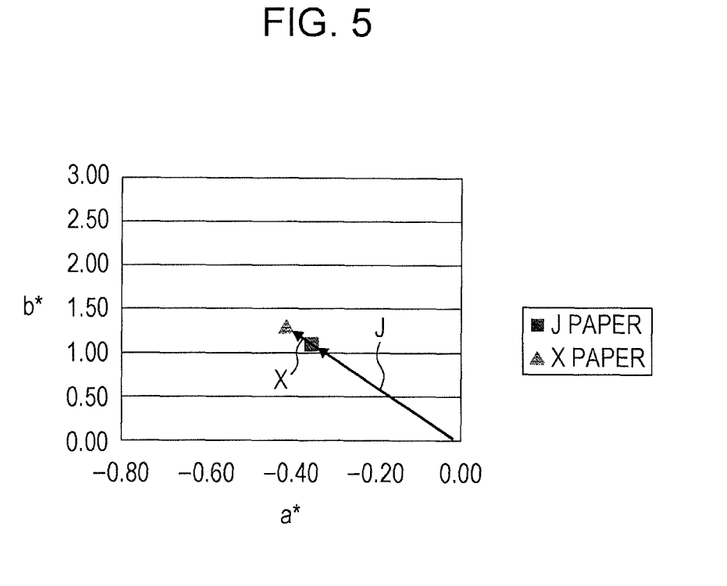
FIG. 5 is an explanatory vector graph in a case where the correction profile is substitutable.

FIG. 5 schematically illustrates hue vectors in this case. The horizontal axis represents a*, and the vertical axis represents b*. Incidentally, represents the position between red/magenta and green. Negative values indicate green, while positive values indicate magenta. In addition, b* represents the position between yellow and blue. Negative values indicate blue, while positive values indicate yellow. In FIG. 5, the hue vectors of J paper are denoted by J, and the hue vectors of X paper are denoted by X. The difference in the hue vectors between J paper and X paper (relative hue value difference) is 0.2. If the difference is lower than a threshold, this means that the hue vectors of J paper and the hue vectors of X paper are identical or similar.

Figure 6:
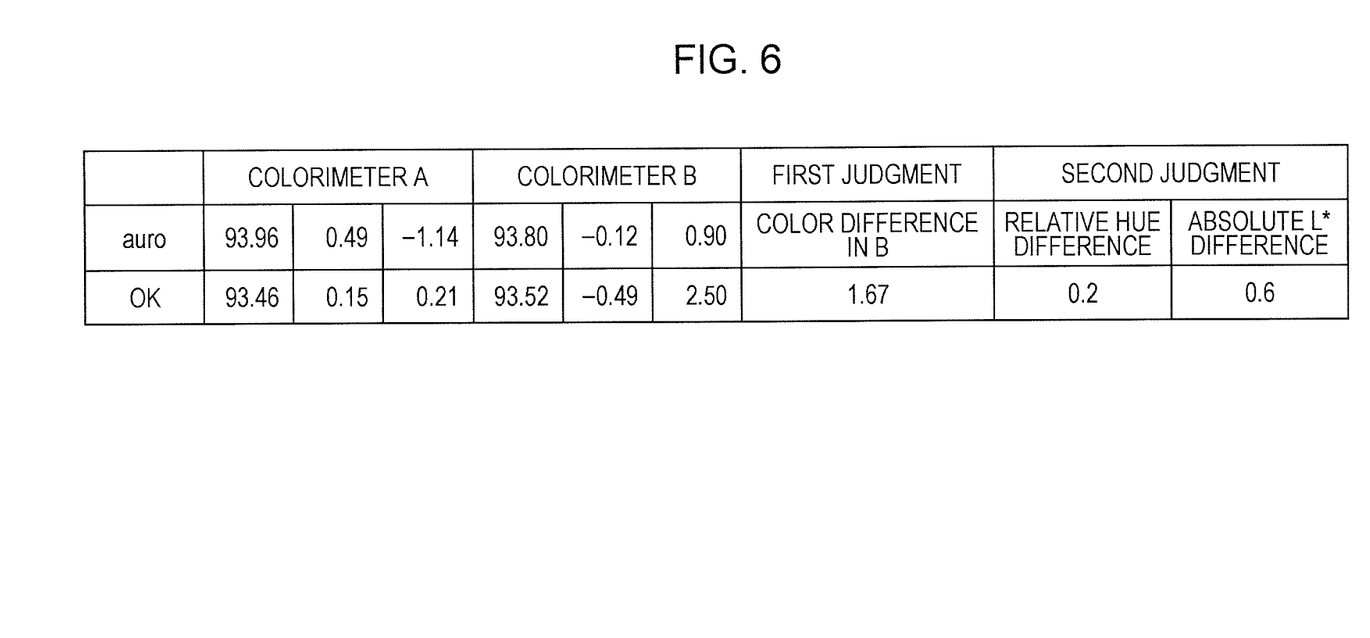
FIG. 6 is a table illustrating examples of a color difference and a relative hue value difference in a case where a correction profile is not substitutable.

FIG. 6 illustrates results of colorimetry performed on auro paper and OK paper that are media different from J paper and X paper in a case where M0 and M2 are used for the colorimeter A and the colorimeter B, respectively.

The colorimetry performed on auro paper results in: L=93.96, a=0.49, and b=−1.14 when the colorimeter A is used; and L=93.80, a=−0.12, and b=0.90 when the colorimeter B is used.

The colorimetry performed on OK paper results in: L=93.46, a=0.15, and b=0.21 when the colorimeter A is used; and L=93.52, a=−0.49, and b=2.50 when the colorimeter B is used.

In the first judgment process in this case, the color difference between auro paper and OK paper is compared with a threshold. For example, the color difference in the B value is calculated as 1.67.

In the second judgment process, a relative hue value difference and an absolute lightness value difference between auro paper and OK paper are compared with a threshold. The relative hue value difference and the absolute lightness value difference are calculated as 0.2 and 0.6, respectively.

In a case where the thresholds in the first and second judgment processes are, for example, 1.5 and 0.3, respectively, the value in the first judgment process and one of the values in the second judgment process are not lower than the respective thresholds. Accordingly, in the flowchart of the process in FIG. 3, the judgement in step S104 is NO, and the correction profile for auro paper is thus not substitutable. In this case, a new correction profile is generated for OK paper.

Figure 7:
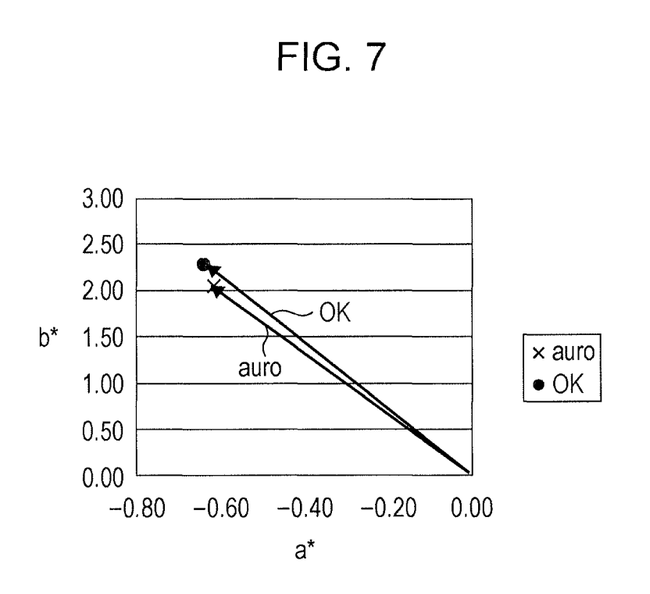
FIG. 7 is an explanatory vector graph in a case where the correction profile is not substitutable.

FIG. 7 schematically illustrates the hue vectors in this case. The horizontal axis represents a*, and the vertical axis represents b*. In FIG. 7, the hue vectors of auro paper are denoted by auro, and the hue vectors of OK paper are denoted by OK. The difference in the hue vectors between auro paper and OK paper (relative hue value difference) is 0.2. Since this is lower than the threshold, the hue vectors of auro paper and the hue vectors of OK paper are identical or similar. However, if the color difference or an absolute lightness value difference is higher than the threshold, the profile for auro paper is not substituted for that for OK paper.

In the exemplary embodiment, in a case where the database has multiple correction profiles for respective types of media and where it is judged whether to generate a correction profile for a new type of medium that has not been registered in the database, the controller 101 may calculate a color difference, a relative hue value difference, and an absolute lightness value difference, compare each value with a corresponding one of thresholds, select a medium having the lowest relative hue value difference from the media each having values lower than the respective thresholds, and set the medium as a medium whose correction profile is substituted for that for the medium of the new type.

For example, the database has J1 paper, J2 paper, and J3 paper that are registered therein, and the relative hue value differences from X paper are ΔC1, ΔC2, and ΔC3, respectively. When ΔC1>ΔC2>ΔC3 holds true, the correction profile for J3 paper that has the lowest relative hue value difference is substituted for the correction profile for X paper.

In the exemplary embodiment, the hue difference and the lightness difference are provided with the same threshold taking on the value of 0.3 but may be provided with thresholds taking on different values, respectively. For example, the thresholds for the hue difference and the lightness difference are set to be 0.5 and 1.0, respectively.

In the exemplary embodiment, an algorithm in which prospective substitutable media types are first selected in the first judgment and a substitutable one of the media types is subsequently designated in the second judgment may be used. Specifically, consider a case where there are ten types of media. For example, among these, three media having color differences equal to or lower than the threshold are first selected in the first judgment and undergo the second judgment. Among the three media, a medium having a hue difference and a lightness difference that are equal to or lower than the respective thresholds and having the lowest value of the hue and lightness difference values is finally selected, and the correction profile for the medium is substituted for a new type of medium.

If there is no medium having a hue difference and a lightness difference that are equal to or lower than the respective thresholds, a medium having the lowest value of the hue and lightness difference values may be selected, and the correction profile for the medium may be processed and substituted.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A color management system comprising:
a memory that stores a correction profile for a first medium, the correction profile being provided for correcting a difference between a plurality of colorimeters; and
a controller configured to:
receive first information, including at least one of color information, hue information, and lightness information for the first medium measured by a first colorimeter;
receive second information, including at least one of color information, hue information, and lightness information for the first medium measured by a second colorimeter;
receive third information, including at least one of color information, hue information, and lightness information for a second medium measured by the first colorimeter, the second medium being different from the first medium;
receive fourth information, including at least one of color information, hue information, and lightness information for the second medium measured by the second colorimeter;
calculate, as a first calculation result, a difference between the first information and the second information;
compare the first calculation result with a first threshold value and determine whether the first calculation result is lower than the first threshold value;
in response to the first calculation result being lower than the threshold value, calculate, as a second calculation result, a difference using the first information, the second information, the third information and the fourth information;
compare the second calculation result with a second threshold value and determine whether the second calculation result is lower than the second threshold value; and
in response to the second calculation result being lower than the threshold value, refrain from generating a new correction profile for the second medium and assign the correction profile for the first medium as a correction profile for the second medium.

2. The color management system according to claim 1, wherein the second calculation result is calculated based on each of a color difference, a hue difference, and a lightness difference with respect to the first information, the second information, the third information and the fourth information.

3. A non-transitory computer readable medium storing a program causing a computer to execute a process comprising:
storing a correction profile for a first medium, the correction profile being provided for correcting a difference between a plurality of colorimeters;
receiving first information, including at least one of color information, hue information, and lightness information for the first medium measured by a first colorimeter;
receiving second information, including at least one of color information, hue information, and lightness information for the first medium measured by a second colorimeter;
receiving third information, including at least one of color information, hue information, and lightness information for a second medium measured by the first colorimeter, the second medium being different from the first medium;
receiving fourth information, including at least one of color information, hue information, and lightness information for the second medium measured by the second colorimeter;
calculating, as a first calculation result, a difference between the first information and the second information;
comparing the first calculation result with a first threshold value and determine whether the first calculation result is lower than the first threshold value;
in response to the first calculation result being lower than the threshold value, calculating, as a second calculation result, a difference using the first information, the second information, the third information and the fourth information;
comparing the second calculation result with a second threshold value and determine whether the second calculation result is lower than the second threshold value; and
in response to the second calculation result being lower than the threshold value, refraining from generating a new correction profile for the second medium and assigning the correction profile for the first medium as a correction profile for the second medium.

4. A color management method comprising:
storing a correction profile for a first medium, the correction profile being provided for correcting a difference between a plurality of colorimeters;
receiving first information, including at least one of color information, hue information, and lightness information for the first medium measured by a first colorimeter;
receiving second information, including at least one of color information, hue information, and lightness information for the first medium measured by a second colorimeter;
receiving third information, including at least one of color information, hue information, and lightness information for a second medium measured by the first colorimeter, the second medium being different from the first medium;
receiving fourth information, including at least one of color information, hue information, and lightness information for the second medium measured by the second colorimeter;
calculating, as a first calculation result, a difference between the first information and the second information;
comparing the first calculation result with a first threshold value and determine whether the first calculation result is lower than the first threshold value;
in response to the first calculation result being lower than the threshold value, calculating, as a second calculation result, a difference using the first information, the second information, the third information and the fourth information;

comparing the second calculation result with a second threshold value and determine whether the second calculation result is lower than the second threshold value; and in response to the second calculation result being lower than the threshold value, refraining from generating a new correction profile for the second medium and assigning the correction profile for the first medium as a correction profile for the second medium.

* * * * *